United States Patent
Moore, Jr. et al.

(10) Patent No.: US 12,248,734 B2
(45) Date of Patent: Mar. 11, 2025

(54) AUDIO SERVICES AGENT MANAGER

(71) Applicant: ARRIS Enterprises LLC, Suwanee, GA (US)

(72) Inventors: Richard Moore, Jr., Harleysville, PA (US); William W. Jennings, Brookhaven, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 304 days.

(21) Appl. No.: 17/739,445

(22) Filed: May 9, 2022

(65) Prior Publication Data

US 2023/0022642 A1    Jan. 26, 2023

Related U.S. Application Data

(60) Provisional application No. 63/222,080, filed on Jul. 15, 2021.

(51) Int. Cl.
*G06F 3/16* (2006.01)
*G10L 15/08* (2006.01)
*G10L 15/22* (2006.01)

(52) U.S. Cl.
CPC .............. *G06F 3/167* (2013.01); *G10L 15/08* (2013.01); *G10L 15/22* (2013.01); *G10L 2015/088* (2013.01); *G10L 2015/223* (2013.01)

(58) Field of Classification Search
CPC ......... G06F 3/167; G10L 15/08; G10L 15/22; G10L 2015/088; G10L 2015/223
See application file for complete search history.

(56) References Cited

U.S. PATENT DOCUMENTS

| | | | |
|---|---|---|---|
| 2018/0040324 A1* | 2/2018 | Wilberding | G06F 3/167 |
| 2020/0135200 A1* | 4/2020 | Taparia | G10L 15/30 |
| 2020/0257853 A1* | 8/2020 | Hussain | G06F 40/216 |

OTHER PUBLICATIONS

International Preliminary Report on Patentability issued Jan. 16, 2024 in corresponding International (PCT) Patent Application No. PCT/US2022/028281.
International Search Report and the Written Opinion of the International Searching Authority dated Jul. 25, 2022 in International (PCT) Application No. PCT/US2022/028281.

* cited by examiner

*Primary Examiner* — Phuong H Nguyen
(74) *Attorney, Agent, or Firm* — Wenderoth, Lind & Ponack, L.L.P.

(57) ABSTRACT

An audio services agent manager (ASAM) of a control device can provide an improved user experience by iterating through a list of audio services agents so as to verify that a requested audio service is provided. The ASAM can receive an audio input from an audio input device and direct the audio input as an audio command to an audio services agent based on an audio service rule. The ASAM can verify processing of the audio command by the audio service agent based on a response received by the ASAM from the audio service agent. If the response indicates success, then the audio service requested by the audio command is provided, otherwise, the ASAM can select another audio services agent based on the audio service rule and proceed to direct the audio command to the newly selected audio services agent so as to provide the requested audio service.

20 Claims, 9 Drawing Sheets

300

| AUDIO INPUT DATA 228 | | |
|---|---|---|
| AC ID 223 | AUDIO INPUT 243 | AUDIO COMMAND 245 |

| TELEMETRY DATA 222 | | | | | | |
|---|---|---|---|---|---|---|
| DATA ID 221 | AC ID 223 | AS AGENT ID 225 | AS AGENT RESPONSE 227 | TRIGGER TYPE 229 | TIMESTAMP ID 231 | AC TYPE 233 |

| AUDIO SERVICE RULE 224 | | | | | |
|---|---|---|---|---|---|
| AS RULE ID 235 | AS AGENT ID 225 | TRIGGER TYPE 229 | AC TYPE 233 | ACTION RULE 237 | AS AGENT RESPONSE TYPE 243 |

| AUDIO SERVICE CONFIGURATION 226 | | | |
|---|---|---|---|
| AS CONFIGURATION ID 245 | AS AGENT ID 225 | AS RULE ID 235 | PARAMETER 241 |

FIG. 6

AUDIO SERVICES AGENT MANAGER

BACKGROUND

As network environments become more complex, users are increasingly expecting integration of all components of the network environment including systems, platforms, devices, etc. Many times these components utilize the same user input mechanisms, such as voice-activation or a physical actuator. In some instances, multiple components may be activated inadvertently or incorrectly based on misdirection of the inputs received from a user input mechanism. Further, requested information may not be retrieved or provided due to the misdirection. A user may incorrectly assume that the network or a particularly is not functioning properly leading to increased costs due to customer service complaints, return of components, lack of trust in the components, etc. Thus, there is a need to provide automatic routing of user inputs, for example, audio inputs, associated with an audio service to provide a result from the audio service to the user so as to improve quality of experience (QoE) to the user and reduce costs associated with the operation and functionality of the components.

SUMMARY

According to aspects of the present disclosure there are provided novel solutions for an audio services agent manager running on a control device to provide one or more audio services. The audio services agent manager receives audio inputs from a variety of audio input devices and directs the audio inputs to the appropriate audio services agent based on an audio service configuration and/or an audio service rule. The audio services agent manager consumes captured audio input, such as audio pulse-code modulation (PCM) input, and routes this audio input to a specific audio services agent (for example, a voice assistant) based on a rule or configuration, such as a wake word, a default-designated audio services agent, or both. The audio services agent manager and/or an audio services agent can perform a conversion or translation of the captured audio input, for example, perform local audio to text or automatic speech recognition on the captured audio input. Based on the conversion or translation, the audio services agent manager can determine if this audio input is a universal device command or other command and how the audio input should be handled, for example, which audio services agent to direct the audio input. The audio services manager can receive a notification response or a result from the audio services agent, such as a message to the user, a status indicative of success or failure of handling the audio input by the audio services agent, etc. The audio services agent manager can verify the handling of the audio input and/or the audio command based on the notification response, the result, and/or a set of rules and/or configuration, the audio services agent manager. For example, if the verification indicates a failure of the processing, the audio services agent manager can determine a default audio services agent, another audio services, and/or the unavailability of an audio services agent to direct the audio input and/or the audio command. These rules or set of rules can be updatable, for example, via a configuration document or other graphical user interface. The audio services agent manager can collect or store telemetry data associated with the captured audio input including the successful or unsuccessful processing, analysis and/or handling of this audio input by any one or more audio services agents. The telemetry data can be communicated to an operator and/or a user, for example, locally via an output device or remotely via an Internet connection. The configuration of the audio services agent manager can be such that privacy controls are maintained to prevent the inadvertent disclosure of private information. This configuration can also indicate whether the audio services manager can control one or more functions or operations of any of the audio services agent such as pause/unpause, activate/deactivate, enable/disable, etc. In this way, the audio services agent manager provides a user with an improved QoE by directing the captured audio input to one or more audio services agents so as to receive the requested information or result associated with the captured audio input.

An aspect of the present disclosure provides a control device. The control device comprises a memory that stores one or more computer-readable instructions associated with an audio services agent manager and a processor. The processor is configured to execute the one or more computer-readable instructions to perform one or more operations to receive an audio input from one or more audio input devices, wherein the audio input is associated with one or more audio services, translate the audio input to an audio command, identify an audio service rule based on the audio command, identify a first audio services agent of a plurality of audio services agents based on the audio service rule, route the audio command to the first audio services agent, receive, from the first audio services agent, a first audio services agent response associated with the audio command, and verify processing of the audio command by the first audio services agent based on the first audio services agent response.

In an aspect of the present disclosure, the processor is configured to execute the one or more computer-readable instructions to further perform the one or more operations to update a telemetry data associated with an audio services controller based on any of the audio command, the first audio services agent, the first audio services agent response, or any combination thereof.

In an aspect of the present disclosure, translating the audio input comprises sending the audio input to an automatic speech recognition agent of the plurality of audio services agents and converting, by the automatic speech recognition agent, the audio input to an audio input text string, wherein the audio command is based on the audio input text string.

In an aspect of the present disclosure, routing the audio command to the first audio services agent comprises sending the audio command via an application programming interface (API) to the first audio services agent, and wherein receiving the first audio services agent response comprises receiving via the API the first audio services agent response from the first audio services agent.

In an aspect of the present disclosure, verifying processing of the audio command by the first audio services agent comprises determining that the first audio services agent failed to execute the audio command.

In an aspect of the present disclosure, the processor is configured to execute the one or more computer-readable instructions to further perform one or more further operations to identify a second audio services agent of the plurality of audio services agents based on the audio service rule, route the audio command to the second audio services agent, receive, from the second audio services agent, a second audio services agent response, verify processing of the audio command by the second audio services agent based on the second audio services agent response.

In an aspect of the present invention, identifying the first services agent is based on a trigger type associated with the audio input.

An aspect of the present disclosure provides a method for an audio services agent manager of a control device to route an audio command. The method comprises receiving an audio input from one or more audio input devices, wherein the audio input is associated with one or more audio services, translating the audio input to an audio command, identifying an audio service rule based on the audio command, identifying a first audio services agent of a plurality of audio services agents based on the audio service rule, routing the audio command to the first audio services agent, receive, from the first audio services agent, a first audio services agent response associated with the audio command, and verifying processing of the audio command by the first audio services agent based on the first audio services agent response.

In an aspect of the present disclosure, the method further comprises further comprising updating a telemetry data associated with an audio services controller based on any of the audio command, the first audio services agent, the first audio services agent response, or any combination thereof.

In an aspect of the present disclosure, the method such that translating the audio input comprises sending the audio input to an automatic speech recognition agent of the plurality of audio services agents, and converting, by the automatic speech recognition agent, the audio input to audio input text string, wherein the audio command is based on the audio input text string.

In an aspect of the present disclosure, the method such that wherein routing the audio command to the first audio services agent comprises sending the audio command via an application programming interface (API) to the first audio services agent, and wherein receiving the first audio services agent response comprises receiving via the API the first audio services agent response from the first audio services agent.

In an aspect of the present disclosure, the method such that verifying processing of the audio command by the first audio services agent comprises determining that the first audio services agent failed to execute the audio command.

In an aspect of the present disclosure, the method further comprising identifying a second audio services agent of the plurality of audio services agents based on the audio service rule, routing the audio command to the second audio services agent, receiving, from the second audio services agent, a second audio services agent response, and verifying processing of the audio command by the second audio services agent based on the second audio services agent response.

In an aspect of the present disclosure, the method such that identifying the first services agent is based on a trigger type associated with the audio input.

An aspect of the present disclosure provides a non-transitory computer-readable medium of a control device storing one or more instructions for routing an audio command by an audio services agent manager. The one or more instructions when executed by a processor of the control device, cause the audio services agent manager of the control device to perform one or more operations including the steps of the methods described above.

The above-described novel solution may be implemented at a audio services system that includes one or more devices, such as a control device that includes an audio services agent manager, according to one or more example embodiments.

Thus, according to various aspects of the present disclosure described herein, it is possible to provide one or more audio services via an audio services agent manager that appropriately and properly directs or routes an audio input to a corresponding audio services agent based on one or more rules or a set of rules.

BRIEF DESCRIPTION OF DRAWINGS

In the drawings, like reference numbers generally indicate identical, functionally similar, and/or structurally similar elements.

FIG. 3 illustrates an exemplary audio input data structure, according to one or more aspects of the present disclosure;

FIG. 4 illustrates an exemplary telemetry data structure, according to one or more aspects of the present disclosure;

FIG. 5 illustrates an exemplary audio service rule structure, according to one or more aspects of the present disclosure;

FIG. 6 illustrates an exemplary audio service configuration structure, according to one or more aspects of the present disclosure;

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
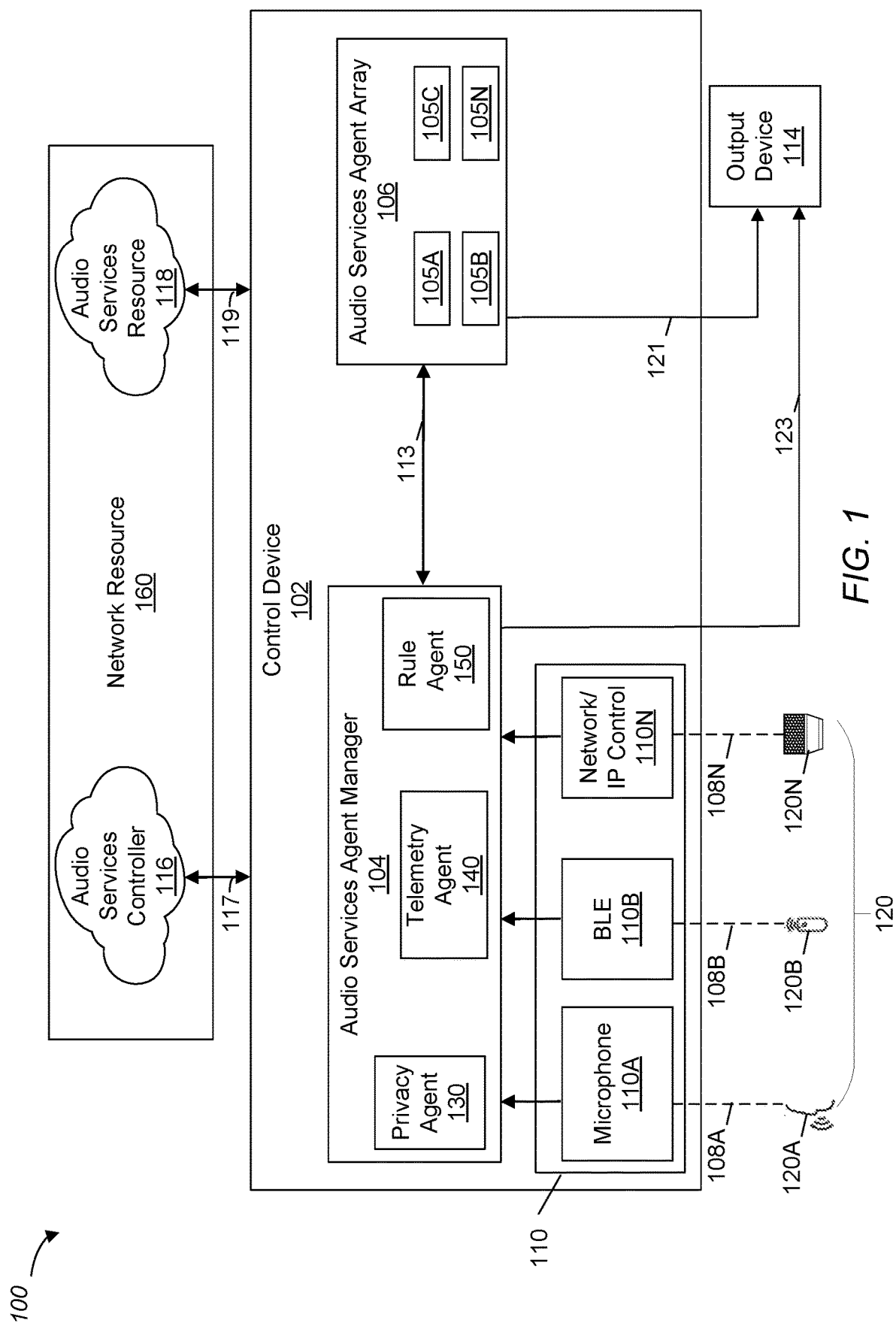
FIG. 1 is a schematic diagram of an audio services system, according to one or more aspects of the present disclosure.

FIG. 1 is a schematic diagram of an audio services system 100, according to one or more aspects of the present disclosure. It should be appreciated that various example embodiments of inventive concepts disclosed herein are not limited to specific numbers or combinations of devices, and there may be one or multiple devices and/or components in the audio services system 100, which may itself consist of multiple communication networks and various known or future developed wireless connectivity technologies, protocols, devices, and the like.

The audio services system 100 can comprise a network resource 160 coupled to a control device 102, one or more audio output devices 108, and an output device 114 coupled to the control device 102. The control device 102 can be a set-top box, a centralized device, any other device and/or system for receiving, processing, and/or otherwise analyzing one or more audio inputs 108 and for providing one or more audio services associated with one or more audio services agents 105. The control device 102 can comprise one or more elements and/or components including, but not limited to, an audio services agent manager (ASAM) 104, and an audio services agent array (ASAA) 106, and one or more audio input receivers (AIR) 110. The audio services agent array 106 can comprise a plurality of audio services agents 105.

The control device 102 can be connected to one or more network resources 160. The one or more network resource 160 can comprise an audio services controller 116 and an audio services resource 118. While audio services controller 116 and audio services resource 118 are shown as separate elements, the present disclosure contemplates that both can be part of and/or included within a single element, such as a single cloud resource. The control device 102 can couple to the audio services controller 116 via a connection 117 and to audio services resource 118 via a connection 119. Connections 117 and 119 can be any type of connection that provides for sending and/or receiving data and can be implemented using a wide area network (WAN), a virtual private network (VPN), metropolitan are networks (MANs), system area networks (SANs), a data over cable service interface specification (DOCSIS) network, a fiber optics network (for example, a fiber to the home (FTTH) or fiber to the x (FTTS), or a hybrid fiber-coaxial (HFC)), a digital subscriber line (DSL), a public switched data network (PSDN), a global Telex network, a 2G, 3G, 4G, 5G, or 6G network or any combination thereof. The network resource 160, audio services controller 116 and the audio service resource 118 can comprise an information handling system, a computer, a server, any other computing device, or any combination thereof that includes a controller or processor for executing one or more computer-readable instructions.

The audio services controller 116 can comprise one or more configuration, settings, and/or controls, such as an audio services agent control, a privacy control, a telemetry data repository for storing telemetry data associated with one or more audio inputs captured by the audio services agent manager 104. For example, the audio services controller 116 can receive telemetry data from any of audio services resource 118, one or more audio services agents 105, audio services agent manager 104, or any combination thereof and store the telemetry data in in a storage system, such as a repository, memory, a database, a data structure, a flat file system, any other type of repository, or any combination thereof. In one or more embodiments, the audio services agent manager 104 can update telemetry data stored at the audio services controller 116 based on the audio input 108, an audio command, an audio service agent 105 associated with the audio input 108 and/or the audio command, a response or agent result from the audio services agent 105, or any combination thereof. In one or more embodiments, the audio services controller 116 can control one or more settings, one or more functions, and/or one or more operations of the audio services agent manager 104. For example, the one or more audio services controller 116 can enable and/or disable a privacy control setting (to control the storage of telemetry data, such as one or more settings of the privacy agent 130), enable and/or disable an audio services agent 105, or both.

The audio services resource 118 can comprise an audio ecosystem cloud or resource. For example, the audio services resource 118 can comprise any of an operator network resource or cloud, a third-party network resource or cloud (such as a resource associated with audio services such as Alexa from Amazon, google search from Google, youtube, etc.), an original equipment manufacturer (OEM) network resource or cloud, any other network resource and/or service provider, or any combination thereof. For example, each audio services agent 105 can be associated with one or more audio services resources 118.

The audio services agent manager 104 controls the capture, processing, routing, handling, analysis, or any combination thereof of one or more incoming, received, or otherwise captured audio inputs 108. Audio inputs 108 can comprise any type of audio including, but not limited to, a voice or utterance. The one or more audio inputs 108 can be received from one or more audio output devices 120 coupled to the audio services agent manager 104 by one or more audio input receivers 110. For example, each audio input 108 can be associated with an audio output device 120, for example, a user 120A (where the user 120A can be a person or a device that outputs audio content), a BLE remote control device 120B (for example, a remote control device that includes a voice receiver that allows a user to input a voice input as the audio input and/or allows a user to enter a text command as an input and provides for transmission of a BLE signal comprising the input), a smart speaker and/or an audio services device 120N (where N represents any number of audio services devices 120). Each audio input 108 can be received by any one or more audio input receivers 110. The one or more audio input receivers 110 can comprise any type of audio input receiver 110, for example, any of a microphone receiver 110A (such as a far-field voice (FFV) receiver) for receiving or capturing audio input 108A from a user 120A, a Bluetooth low Energy (BLE) receiver 110B for receiving or capturing audio input 108B from a BLE remote control 120B, a network/internet protocol (IP) control receiver 110N for receiving or capturing audio input 108N from an audio services device 120N, where N represents any number of audio input receivers 110, or any combination thereof.

The microphone receiver 110A can receive, capture, and/or process an audio input and provide acoustic processing, such as echo cancellation, wake word detection or both. The BLE receiver 110B can receive, capture, and/or process a BLE signal from the BLE remote control 120B. The network/IP control receiver 110N can comprise one or more general voice add-ons, for example, any of one or more extra voice plugins for one or more devices such as smart speakers, mobile devices, any other voice device, or any combination thereof that are connected to the control device 102 via the network so as to receive, capture, and/or process an audio input 108.

The audio services agent manager 104 can perform one or more operations or functions associated with one or more audio services associated with one or more audio service agents 105, one or more audio inputs 108, or both. The audio services agent manager 104 can communicate with an audio services agent control of the audio services controller 116 to receive an audio service configuration, an audio service rule, or both, for example, as discussed with reference to FIG. 6 and FIG. 5, respectively. The audio services controller 116 can provide the audio services agent manager 104 with one or more privacy controls. The one or more privacy controls can be part of the audio service configuration, for example, one or more parameters of an audio service configuration as discussed with reference to FIG. 6. The one or more privacy controls can identify types of data that should not be stored or maintained as part of the telemetry data associated with an audio input and/or an audio services response, allow access to or processing by only those audio input receivers 110 associated with an active or enabled audio service agent 105, provide any other privacy control, or any combination thereof. The audio services agent manager 104 can any of enable, disable, or otherwise control and/or set one or more configurations, or any combination thereof of an audio services agent 105, for example, based on an instruction or command from the audio services controller 116. The audio services agent manager 104 can maintain telemetry data associated with one or more audio inputs, one or more audio services agent 105, or both, for example, as discussed with reference to FIG. 4. The audio services agent manager 104 can include an audio to text conversion module, such as an ASR module, so as to convert or translate a received or captured audio input 108 to an audio command for communication to a selected or determined audio services agent 105.

In one or more embodiments, the audio services agent manager 104 routes or sends a received or captured audio input 108 to an audio services agent 105 and/or an audio services agent array 106 via a connection 113, for example, based on a rule or a configuration. The connection 113 can provide an interface between the audio services agent manager 104 and any one or more audio services agents 105, for example, an application programming interface so as to allow communication between an API of the audio services agent manager 104 and an API associated with a corresponding audio services agent 105, such as transmission of one or more audio inputs and/or audio commands to one or more audio services agents 105 and receipt of one or more responses from the one or more audio services agents 105. The audio services agent manager 104 can determine which audio services agent 105 of the audio services agent array 106 to direct the audio input 108, for example, to any of an audio services agent 105A associated with an operator (such as an Internet provider), a third-party audio services agent 105B (such as an Amazon Alexa agent, a Google Assistant agent, an LGI agent), an audio to text conversion agent 105C (such as an automatic speech recognition (ASR) agent), a universal device command (UDC) and/or local audio command processing agent 105N, where N represents any number of audio services agent 105, any other audio services agent 105, or any combination thereof. The audio services agent array 106 and/or any one or more audio services agents 105 can communicate with the audio services resource 118 via connection 119. For example, an audio services agent 105 can send or transmit a request, such as an audio input 108 and/or an audio command based on the audio input 108, to an associated audio services resource 118 and receive a response from the associated audio resource 118 based on the request. The audio services agent 105 can output the response to an output device 114 via a connection 121. In one or more embodiments, the output device 114 can be part of or included within the control device 102. In one or more embodiments, the output device 114 comprises any of a speaker, a display, any other visual and/or auditory indicator, or any combination thereof. In one or more embodiments, the audio services agent manager 104 can receive a response associated with an audio input 108 and/or an audio command from an audio services agent 105 via connection 113 and transmit or send the response to the output device 114 via a connection 123. The audio services agent manager 104 can provide one or more symbols, one or more indicators, one or more messages, or any other visual and/or auditory notification and/or listing to the output device 114 so as to inform a user of one or more settings, one or more parameters, a status, etc. of any one or more audio services agents 105.

In one or more embodiments, the audio services agent manager 104 sends the audio input 108 to the ASR agent 105C via connection 113 and the ASR agent 105C converts or translates the audio input 108 to an audio command for processing by one or more other audio services agents 105. For example, the ASR agent 105C can send the translated or converted audio input 108 to the audio services agent manager 104 as text via connection 113 and the audio services agent manager 104 selects an audio services agent 105 and sends an audio command to the selected audio services agent 105 based on the text. In one or more embodiments, the audio services agent manager 104 comprises an audio to text conversion agent 105C that converts or translates the audio input 108 to an audio command and the audio services agent manager 104 determines which audio services agent 105 of the array of audio services agent array 106 should receive the audio command. In one or more embodiments, if the audio services agent manager 104 includes a local ASR module the audio to text conversion of a captured audio input 108 can be performed locally, otherwise, the conversion can be performed by the audio services agent 105C.

The audio services agent manager 104 can comprise a privacy agent 130, a telemetry agent 140, and a rule agent 150. The privacy agent 130 can control the storage, sharing, any other transmission, or any combination thereof of audio input 108, for example, the transmission of the audio input 108 to an audio services resource 118, any other repository and/or resource, or any combination thereof. The privacy agent 130 can control access to one or more audio input receivers 110. For example, the privacy agent 130 can interface with an audio service configuration file or structure (as discussed with reference to FIG. 6) to determine which audio services agents 105 should receive audio input 108 based on an associated status. For example, a status of activated or not activated, enabled or disabled, otherwise operable, or configured to receive audio input 108. Based on this determination, the privacy agent 130 can allow audio input 108 to be received only from those audio input receivers 110 that are associated with an audio services agent 105 with a certain status, such as a status indicating that the audio services agent 105 is enabled or activated.

The telemetry agent 140 can process and/or store data indicative of one or more metrics or statistics associated with an audio input 108. For example, the telemetry agent 140 can store data associated with the audio input 108 as part of a telemetry data structure (as discussed with reference to FIG. 4). The telemetry agent 140 can provide or send the data to the audio services controller 116 via connection 117. The telemetry agent 140 can base the collection, storage, and/or processing of the data on the privacy agent 130, such as based on a setting received by the privacy agent 130 from the audio services controller 116. For example, the privacy agent 130 can determine that the data is associated with a privacy rule such that the data should not be any of communicated, stored, shared, or any combination thereof with any other network device or element, such as the audio services controller 116.

The rule agent 150 can process and/or interface with one or more data structures, for example, as discussed with reference to FIGS. 3-6. The rule agent 150 can retrieve or access a rule associated with any one or more audio input receivers 110, one or more audio services agent 105, or both. In one or more embodiments, the rule agent 150 accesses a data structure from a memory based on an audio input 108 so as to determine which one of a plurality of audio services agents 105 should receive the audio input 108 and/or an associated audio command. The rule agent 150 can determine whether a user, network resource, operator, and/or provider can access one or more data structures as discussed with reference to FIGS. 3-6. For example, the rule agent 150 can determine whether an audio services agent 105 can be enabled/disabled, activated/deactivated, etc. by a user.

Figure 2:
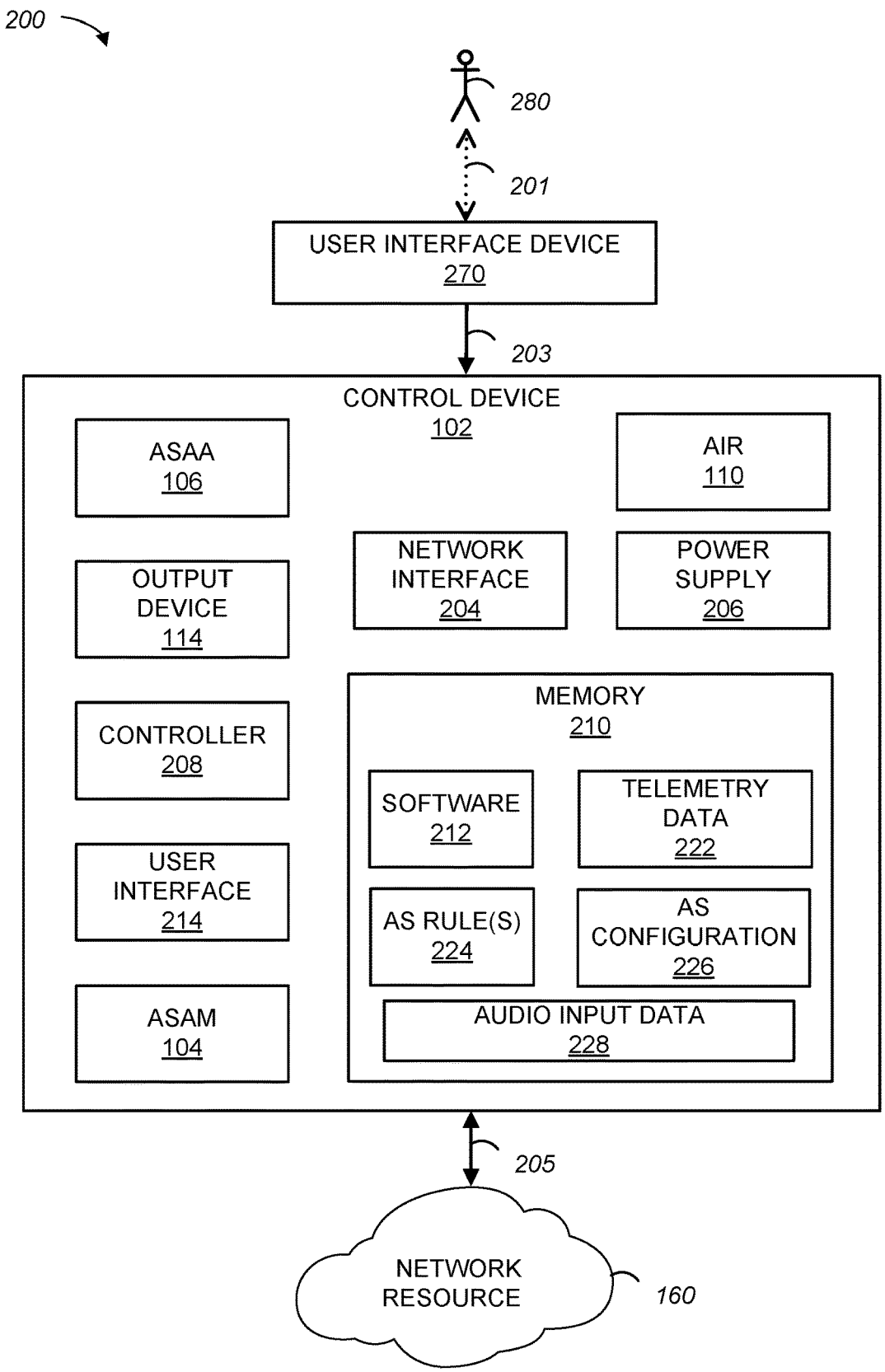
FIG. 2 is a block diagram of an audio services system, according to one or more aspects of the present disclosure.

FIG. 2 is a block diagram of an audio services system 200 similar to or the same as audio services system 100 of FIG. 1, according to one or more aspects of the present disclosure. The control device 102 can include one or more elements including, but not limited to, any of an output device 114, a network interface 204, a power supply 206, a controller 208, a memory 210, a user interface 214, an audio services agent manager 104, an audio services agent array 106 (and/or one or more audio services agents 105), one or more audio input receivers 110, any other element, or a combination thereof.

The output device 114 can comprise any device that provides for the playback and/or reproduction of any of audio, video, multimedia content, any other content, or any combination thereof, for example, to a user 280 including, but not limited to, any of a speaker, a sound bar, a display (such as a television, a monitor, a projector, and/or any other audio playback device, video playback device, or both), any other device that is capable of providing multi-media, visual, and/or auditory content for consumption by a user 280, or any combination thereof. For example, output device 114 can output a response received from any one or more audio services agents 105, an audio services resource 118, or both.

The network interface 204 can include, but is not limited to, various network cards, interfaces, and circuitry implemented in software and/or hardware to enable communications with any of one or more elements of user interface device 270, network resource 160, any other device, or a combination thereof using the communication protocol(s) in accordance with any connection, for example, connection 203 and 205. The power supply 206 supplies power to any one or more of the internal elements of the control device 102, for example, through an internal bus. The power supply 206 can be a self-contained power source such as a battery pack with an interface to be powered through an electrical charger connected to an outlet (for example, either directly or by way of another device). The power supply 206 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The controller 208 controls one or more operations of the control device 102 and can comprise any of or any combination of a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of computer-readable instructions, algorithms, or software including the software 212 stored in a memory 210 for controlling the operation and functions of the control device 102 in accordance with the embodiments described in the present disclosure. Communication between any element of the control device 102 can be established using an internal bus.

The memory 210 can comprise a single memory or one or more memories or memory locations that can include, but are not limited to, any of a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical drive, a hard disk, any other various layers of memory hierarchy, any other non-transitory computer-readable medium, or any combination thereof. The memory 210 can be used to store any type of computer-readable instructions, software, or algorithms including software 212 for controlling one or more functions and operations of the control device 102 in accordance with the embodiments described in the present disclosure. In one or more embodiments, software 212 includes one or more applications and/or computer-readable instructions for providing, controlling, processing, and/or otherwise handling data and/or one or more services, such as capturing audio input 108 associated with one or more audio services agents 105. Memory 210 can also store data or information associated with one or more elements or components of the control device 102 including, but not limited to, any of a telemetry data 222, an audio service rule 224, an audio service configuration 226, an audio input data 228, any other data structure or information, or any combination thereof.

The user interface 214 can comprise any of one or more tactile inputs (for example, a push button, a selector, a dial, a remote control unit (RCU), etc.), a camera, a keyboard, an audio input, for example, a microphone, a keypad, a liquid crystal display (LCD), a thin film transistor (TFT), a light-emitting diode (LED), a high definition (HD) or other similar display device including a display device having touch screen capabilities so as to allow interaction between one or more users 280 and the control device 102, or a combination thereof. The one or more users 280 can be any of a human, a device with audio output capabilities, or both.

In one or more embodiments, the control device 102 is coupled or connected to a user interface device 270 via a connection 203 so as to provide and/or receive inputs and/or outputs to and/or from a user 280. In one or more embodiments, the user interface device 270 or one or more elements of the user interface device 270 are incorporated within or as part of the control device 102.

In one or more embodiments any of connection 203 or connection 205 can be a bidirectional communication link such that any one or more communications or messages can be sent and/or received by any of the control device 102, the user interface device 270, the network resource 160, or any combination thereof. A connection 203 or a connection 205 can be a wired and/or wireless connection.

Further, any, all, or some of the electronic elements or electronic computing devices can be adapted to execute any operating system, including Linux, UNIX, Windows, MacOS, DOS, and ChromOS as well as virtual machines adapted to virtualize execution of a particular operating system, including customized and proprietary operating systems. Any, all or some of the electronic components or electronic computing devices are further equipped with components to facilitate communication with other devices over the one or more network connections to local and wide area networks, wireless and wired networks, public and private networks, and any other communication network enabling communication for the control device 102, the user interface device 270, the network resource 160, or any combination thereof.

FIG. 3 illustrates an exemplary audio input data structure 300, according to one or more aspects of the present disclosure. The audio input data structure 300 comprises audio input data 228 associated with one or more audio inputs 108. The audio input data 228 can comprise an audio command (AC) identifier (ID) 223, an audio input 108, an audio command 245, any other data or information associated with captured or received audio input 108, or any combination thereof. The audio command ID 223 is a unique identifier associated with the audio input 108. The audio input 108 can be translated or converted to an audio command 245, such as by an analog-to-digital control (ADC). In one or more embodiments, the audio input 108 can be translated or converted to an audio command 245 by an audio to text function (such as an ASR function), such as by a local audio to text conversion module of the audio services manager 104 or an audio to text conversion agent 105C. If the audio input 108 is not translated or converted, the audio command 245 can be the same as the audio input 108. For example, throughout this disclosure, an audio command 245 can refer to an audio input 108 that has not been converted to text but has otherwise been processed, analyzed or handled as an audio command. Table 1 illustrates exemplary audio input data 228. Audio command ID 223 of "[0001]", "[0002]" and "[0003]" are associated with audio inputs 108 that correspond to audio captured as indicated by "~ . . . ~" and where the associated captured audio is converted to an audio command 245 as indicated by " . . . ". In one or more embodiments, the audio command 245 can be a NULL or empty string, for example, when no audio to text function is applied to the audio input 108 as illustrated in Table 1 at audio command ID 223 of "[0005]". In one or more embodiments, the audio input 108 is received as a text string such that the audio input 108 and the audio command 245 are identical or have the same value as shown in Table 1 at audio command ID 223 of "[0004]". In one or more embodiments, the audio input 108 is not converted or translated to text such that the audio input 108 and the audio command 245 are both audio-based data as shown in Table 1 at audio command ID 223 of [0006].

TABLE 1

Audio Input Data

| AC ID 223 | Audio Input 108 | Audio Command 245 |
| --- | --- | --- |
| [0001] | ~Agent A, What is my download speed~ | "Agent A, What is my download speed" |
| [0002] | ~Agent A, What is the temperature today~ | "Agent A, What is the temperature today" |
| [0003] | ~Volume Down~ | "Volume Down" |
| [0004] | "Volume Up" | "Volume Up" |
| [0005] | ~Agent B, Stop Agent A~ | <NULL> |
| [0006] | ~<Wake Word>~ | ~<Wake Word>~ |

FIG. 4 illustrates an exemplary telemetry data structure 400, according to one or more aspects of the present disclosure. The telemetry data structure 400 comprises telemetry data 222 associated with the processing, analyzing, or otherwise handling of a captured or received audio input 108. The telemetry data 222 can comprise a data ID 221, an audio command (AC) ID 223, an audio services agent ID 225, an audio services agent response 227, a trigger type 229, a timestamp ID 231, an audio command type 233, any other data or information associated with the processing, analyzing, or otherwise handling of a captured or received audio input 108, or any combination thereof. The data ID 221 comprises a unique identifier associated with the telemetry data 222. The audio command ID 223 comprises corresponds to the audio command ID 223 as discussed with reference to FIG. 3. The audio services agent ID 225 comprises a unique identifier associated with an audio services agent 105 that received the audio command associated with the audio command ID 223. The audio services agent response 227 comprises an indicator associated with the execution or processing of the audio command 245 associated with the audio command ID 223 by the audio services agent 105. For example, the audio services agent response 227 can indicate that the audio command 245 was executed successfully, failed to execute, required additional processing or input, was rejected or ignored, an error occurred, any other response, or any combination thereof. The trigger type 229 indicates how the audio command 245 associated with the audio command ID 223 was received, for example, the type of audio input receiver 110 that received the audio input 108, the type of audio output device 120, or both. For example, the trigger type 229 can comprise any number of triggers including, but not limited to, any of a push-to-talk (PTT) (such as BT or BLE PTT), a wake command (such as a FFV wake word), voice recognition, any other input or indicator associated with an audio input 108, or any combination thereof. The timestamp ID 231 indicates a date and/or time that the audio command 245 associated with the audio command ID 223 was received or captured by the control device 102. In one or more embodiments, the telemetry data 222 can comprise an audio command type 233 associated with the audio command ID 223, for example, an On/Off command, an alter/change setting and/or configuration command (such as change default audio services agent), a universal device command, any other type of command, or any combination thereof. The telemetry data 222 can comprise any other information that a services provider, operator, user, or other network resource configures the control device 102 to capture. The telemetry data 222 can be restricted as to the type of information collected by the privacy agent 130 such that personal or private information is not collected and/or stored as part of the telemetry data 222.

In one or more embodiments, telemetry data 222 can be retrieved or otherwise polled from a remote network resource, such as an audio services controller 116. An audio services controller 116 can send a query or request for the telemetry data 222 to the control device 102. For example, a user or operator can request that the audio services controller 116 collect telemetry data 222 from a control device 102 so as to analyze the telemetry data 222, such as to any of provide use statistics, analyze and/or determine habits of a user, target advertising to the user, any other processing, or any combination thereof.

FIG. 5 illustrates an exemplary audio service rule structure 500, according to one or more aspects of the present disclosure. The audio service rule structure 500 comprises an audio service rule 224 that provides information for the processing, analysis, or otherwise handling of the received audio input 108 and/or an audio command 245 and/or the action to take based on a response from and audio services agent 105 to an audio input 108 and/or an audio command 245. For example, a rule agent 150 can select an audio services agent 105 for receiving an audio input 108 and/or audio command 145 based on an audio service rule 224. In one or more embodiments, the audio service rule 224 is configurable by any of a user, an operator (for example, a multiple services operation (MSO), an administrator, a services provider, any other entity or user with configuration privileges, or any combination thereof. The audio service rule 224 can comprise an audio service rule ID 235, an audio services agent ID 225, a trigger type 229, an audio command type 233, an action rule 237, and an audio services agent response type 243. The audio service rule ID is a unique identifier associated with the audio service rule 224. The audio services agent response type 243 is associated with one or more responses from an audio services agent 105, for example, an audio services agent response 227. The audio services agent response type 243 can include any number of response types associated with any number of audio services agent responses 227, for example, as indicated in Table 2. The action rule 237 can indicate an action to take based on any of the audio services agent response 227, the audio command type 237, the trigger type 229, or any combination thereof. For example, an audio service rule 224 can indicate by the action rule 237 that a first audio services agent 105 (that corresponds to an audio services agent ID 225) should be the default agent such that all received audio inputs 108 and/or audio commands 245 are initially sent to the first audio services agent 105. The audio service rule 224 can indicate based on the action rule 237 that a response of "rejected", "failed", "ignored" or any similar response that is associated with an audio services agent response type 243 from the first audio services agent 105 that the audio input 108 and/or audio command 245 be sent to a second audio services agent 105 and so on until either all audio services agents 105 have been sent the audio input 108 and/or the audio command 245 or a response indicative of success, acceptance, more information needed, etc. has been received. For example, the audio service rule 224 can indicate a priority for one or more audio services agents 105 so as to define the order to route or send the audio input 108 and/or audio command 245 to the available or acceptable one or more audio services agents 105. As another example, an audio service rule ID 235 associated with an audio command type 233 can indicate that a particular audio services agent ID 225 should be selected for the processing, analysis, or otherwise handling of the audio input 108 and/or audio command 245 based on the identified audio command type 233. For example, an action rule 237 can be associated with an audio command type 233 and an associated audio services agent ID 225. As an example, if the audio input 108 and/or the audio command 245 is identified as an audio command type 233 of a universal device command, then the associated audio services agent ID 225 would be selected to receive the audio input 108 and/or the audio command 245.

TABLE 2

Audio Services Agent Response Type
AS Agent Response Type 243

Failed
Success
Accepted
Ignored
More Information Needed
Command Not Recognized
Error
Unable to Process FIG. 6 illustrates an exemplary audio service configuration structure 600, according to one or more aspects of the present disclosure. The audio service configuration structure 600 comprises an audio service configuration 226 that provides configuration information for one or more audio services agents 105. The audio service configuration 226 can comprise an audio service configuration ID 245, an audio services agent ID 225, an audio service rule ID 235, and one or more parameters 241. The audio service configuration ID 245 is a unique identifier associated with an audio service configuration 226 for an audio service agent 105 identified by the audio services agent ID 225. For example, an audio service configuration 226 can indicate one or more audio service rules 224 as identified by the audio service rule ID 235 that are associated with a particular audio services agent 105 as identified by the audio services agent ID 225. The one or more parameters 241 can comprise one or more privacy settings associated with an audio services agent 105, one or more functions or operations permitted to be performed by the audio services agent 105, one or more settings that are configurable, any other parameter associated with an audio services agent, or any combination thereof.

The present disclosure contemplates that any one or more of the data structures of FIGS. 3-6 can be implemented as an object, a data structure, a table, for example, in a row/column database or repository, a flat-file system, any other storage mechanism, or any combination thereof. The present disclosure contemplates that any one or more elements of the one or more data structures of FIGS. 3-6 can be omitted and/or arranged in any order and that any one or more other elements can be included. While each of the structures in FIGS. 3-6 are illustrated as a single data structure, the present disclosure contemplates that any one or more of the data structures of FIGS. 3-6 can be implemented as one or more data structures, one or more tables, or any other one or more elements, or any combination thereof. Any one or more of the data structures of FIGS. 3-6 can comprise metadata associated with, for example, any one or more audio inputs 108. In one or more embodiments, any of the data structures of FIGS. 3-6 are configurable by any of a user, an operator (for example, a multiple services operation (MSO), an administrator, a services provider, any other entity or user with configuration privileges, or any combination thereof. In one or more embodiments, a mobile application, such as an app for a smartphone, a universal resource locator (URL), a website, any other application or software, or any combination thereof, can be used to access any one or more elements of the control device 102 including, but not limited to, any of a telemetry data 222, an audio services agent 105, a privacy control parameter 241 of an audio service configuration 226, any one or more data structures (such as any one or more data structures of FIGS. 3-6), or any combination thereof. For example, a user can start, stop, pause, delete, or any other operation/function an audio services agent 105 and/or configure one or more audio services agents 105 (such as via one or more data structures of FIGS. 3-6).

Figure 7:
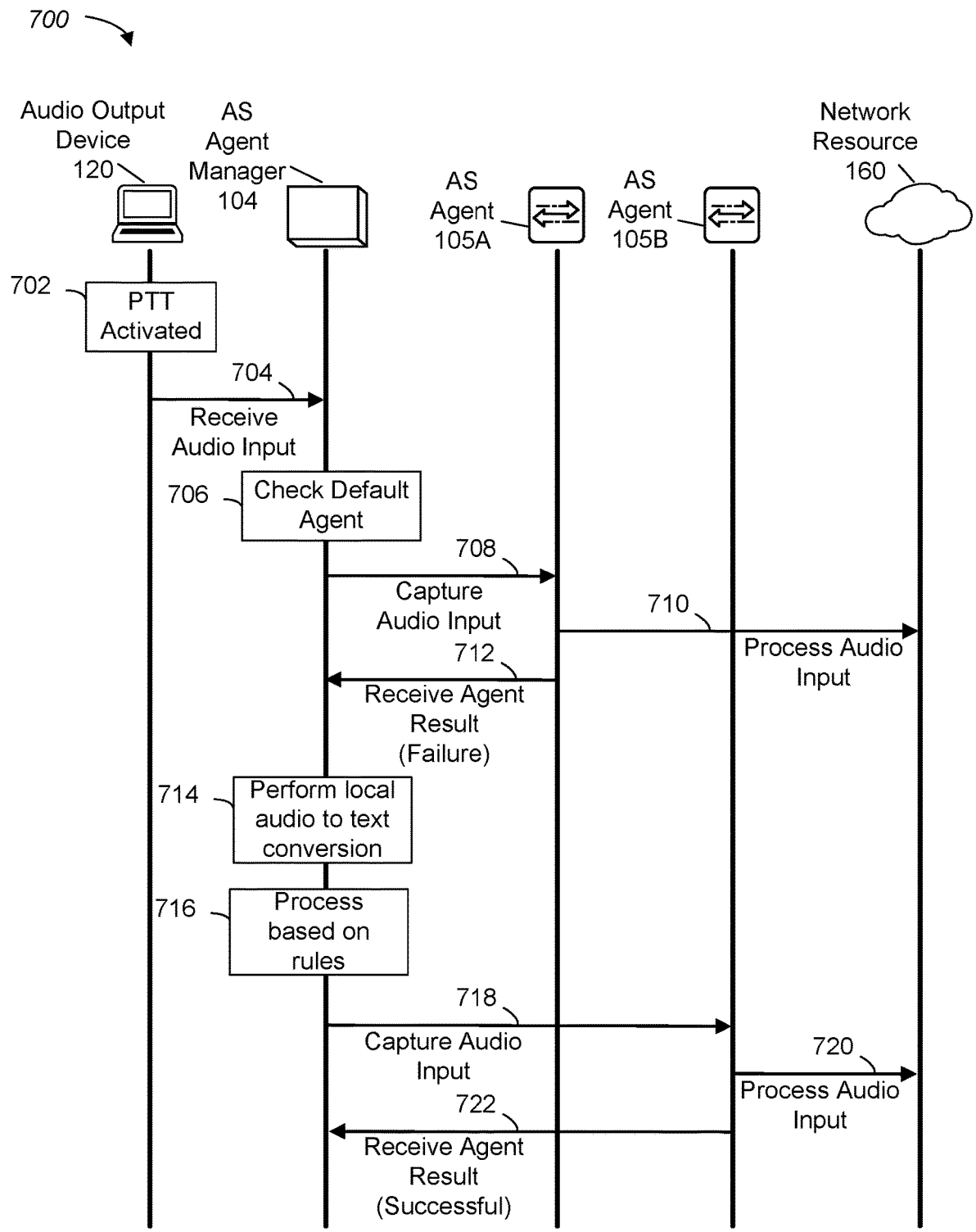
FIG. 7 illustrates a flow diagram of a push-to-talk activation of the audio services agent manager, according to one or more aspects of the present disclosure.

FIG. 7 illustrates a flow diagram 700 of a push-to-talk activation of the audio services agent manager 104, according to one or more aspects of the present disclosure. For push-to-talk activation, a default audio services agent 105 can be associated with the trigger type 229 indicative of push-to-talk. For example, an audio service rule 224 can identify an audio services agent ID 225 for a trigger type 229 associated with PTT activation. In one or more embodiments, a control device 102 can connect to a network resource, such as an audio services controller 116, an audio services resource 118, any other network resource, or any combination thereof to initialize, obtain configuration information, download one or more files, resources, instructions, etc. such as one or more upgrades, or any other operation instructions, establish connectivity to the Internet or a network, any other initialization and/or configuration purposes, or any combination thereof. In one or more embodiments, the initialization prepares the audio services agent manager 104 of the control devices 102 to provide one or more audio services based on one or more audio inputs 108.

At step 702, an audio output device 120, such as a laptop, remote control device, or any other device that provides for push-to-talk audio, receives a PTT request from a user such that PTT is activated at the audio output device 120. Once PTT is activated (such as a user presses a button on a remote control device), the audio output device 120 listens for an audio input 108. The audio output device 120 communicates the audio input 108 to the control device 102. For example, at step 704, an audio services agent manager 104 receives the audio input 108 from the audio output device 120. The audio services agent manager 104 can determine how to process, analyze, or otherwise handle the audio input 108 based on an audio service rule 224. For example, at step 706, the audio services agent manager 104 can determine that that audio input 108 was received due to a trigger type 229 of PTT. The audio services agent manager 104 can determine or check for a default audio services agent 105 associated with the trigger type 229. As an example, the audio services agent manager 104 can determine that the trigger type 229 is associated with an audio service rule 224 that indicates a default audio services agent 105, for example, audio services agent 105A, as identified by the audio services agent ID 225.

At step 708, the audio services agent 105A, identified as the default audio services agent, captures or receives the audio input 108 from the audio services agent manager 104. The audio services agent 105A can, at step 710, send a request to an audio services resource 118 associated with the network resource 160 for the audio services resource 118 to process the audio input 108 and/or an audio command 245. For example, the audio services agent manager 104 can route or send an instruction to the audio services agent 105A that causes the audio services agent 105A to send the request to the network resource 160. The audio services agent 105A can attempt to process the audio input 108.

The audio services agent manager 104 can verify whether the audio services agent 105 properly handled the audio input 108 and/or the audio command 245. For example, at step 712, the audio services agent 105 receives an agent result indicative of an audio services agent response type 243. As an example, the verification can include determining if the audio services agent 105A is unsuccessful or if an error occurred during processing of the audio input 108 based on the response or agent result received from the audio services agent 105 which indicates the failure, for example, as indicated in Table 2. In one or more embodiments, the audio services agent 105A can process the audio input 108 and/or audio command 245 locally as opposed to routing or sending the audio input 108 and/or audio command 245 to an associated network resource 160 as in step 710. Once the audio input 108 and/or audio command 245 is processed by the local audio services agent 105A, the audio services agent 105A can send a response to the audio service agent manager 104. The response can be indicative of the status of the processing of the audio input 108 and/or the audio command 245, for example, that the audio input 108 and/or audio command 245 was processed successfully or unsuccessfully (failed to be processed by the audio services agent 105A).

At step 714, the audio services agent manager 104 based on the response or agent result received can perform a local audio to text conversion of the audio input 108 or send the audio input 108 to an ASR 105 so as to obtain an audio command 245. For example, based on one or more audio service rules 224, the next audio services agent 105 can require an audio command 245 and thus the audio input 108 must be converted or translated from audio to text or can accept the raw or unaltered audio input 108. The audio command 245 is then processed, at step 716, based on one or more audio service rules 224. For example, the audio service rule 224 can indicate that the audio command 245 should be sent to audio services agent 105B such that at step 718, the audio services agent 105B captures or receives the audio input 108 and/or the audio command 245. The audio service rule 224 can be implemented as a sequential list of available audio services agents 105 where any one or more audio service agents 105 are of a different type and where the sequential list can be based on a priority associated with the audio service agent 105.

As discussed with respect to step 710, the audio services agent 105B can route or send a request at step 720 for the audio services resource 118 of the network resource 260 to process the audio input 108 and/or the audio command. For example, the audio services agent manager 104 can route or send an instruction to the audio services agent 105B that causes the audio services agent 105B to send data request to the network resource 160 so as to process the audio input 108 and/or the audio command 245. At step 722, the audio services agent manager 104 receives a response or agent result from the audio services agent 105B. The audio services agent manager 104 verifies that the audio services agent 105 properly handled the audio input 108 and/or the audio command 245 based on the received response or agent result. For example, the response or agent result can indicate that the audio input 108 and/or the audio command 245 from step 718 was processed, analyzed, or otherwise handled successfully. By having a default audio services agent 105 designated to first receive the audio input 108, the process is streamlined as the default audio services agent many if not all of the audio inputs can be handled by the default audio services agent and if not the audio service rule 224 provides the next audio services agent 105, for example, an audio services agent 105 that is indicated as being most likely to be able to provide the requested audio service based on the audio input 108 and/or the audio command 245 or that is identified based on a history associated with the audio input 108 and/or the audio command 245, that is the next audio services agent 105 in a list provided by a user, an administrator, or any other setup and/or configuration.

Figure 8:
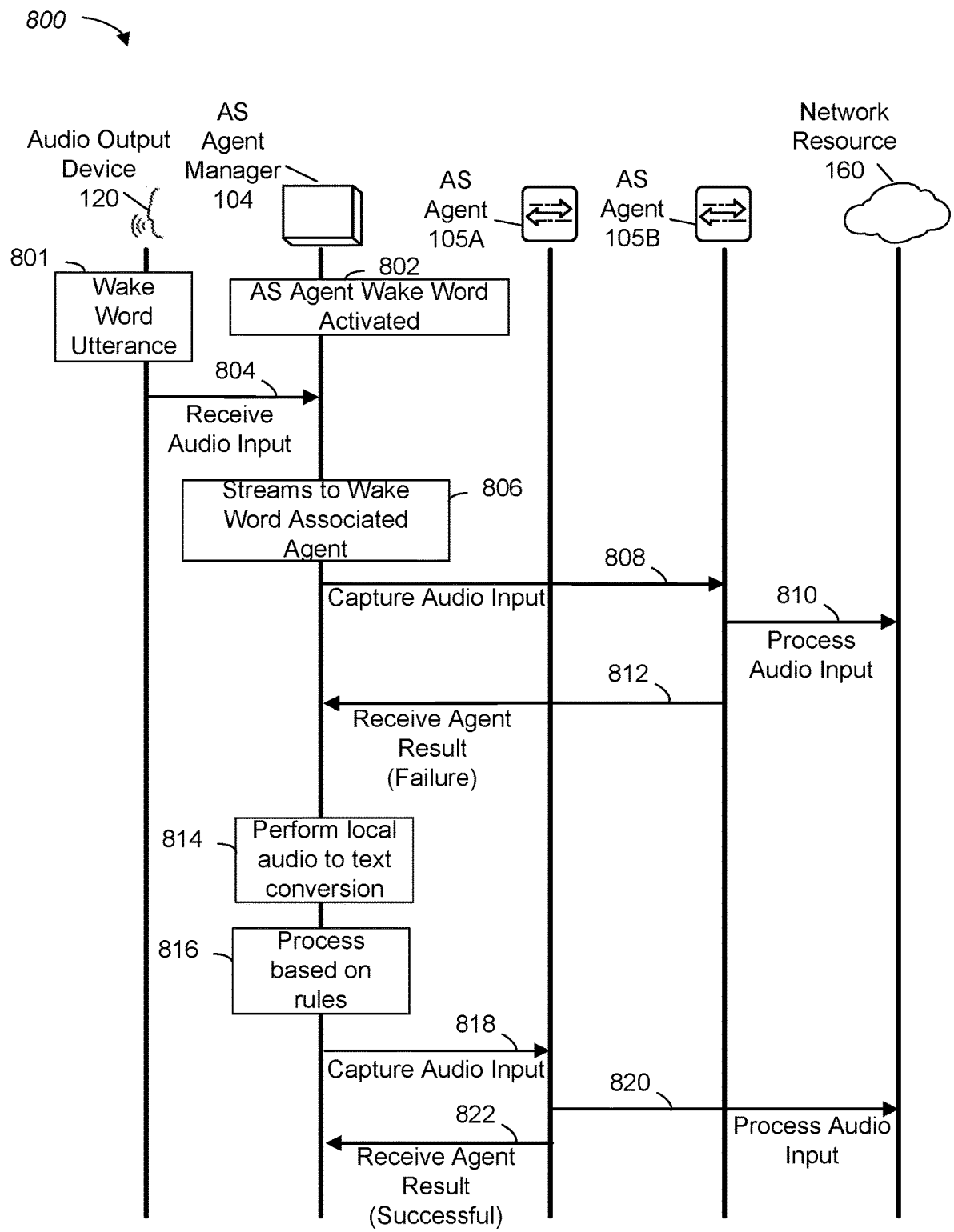
FIG. 8 illustrates a flow diagram of an audio services agent wake word activation of the audio services agent manager, according to one or more aspects of the present disclosure.

FIG. 8 illustrates a flow diagram 800 of an audio services agent wake word activation of the audio services agent manager 104, according to one or more aspects of the present disclosure. A wake word, for example, can be used for activation using an FFV output device 120 and/or a PTT output device 120. Different wake words can be associated with one or more audio services agents 105 such that a different audio services agent 105 is selected based on the wake word. At step 801, an audio output device 120 outputs a wake word utterance as an audio input 108. The audio services agent wake word is activated at the audio services agent manager 104, at step 802, by the wake word utterance in step 801. At step 804, the audio services agent manager 104 receives an audio input 108 associated with the wake word utterance from step 801 from the output device 120 (for example, a user).

At step 806, the audio services agent manager 104 streams the audio input 108 received at step 804 to a wake word associated audio services agent 105, such as audio services agent 105B. For example, the audio input 108 is sent to the audio services agent 105 associated with or activated by the wake word utterance of step 801. For example, a particular audio services agent 105 can be associated with a unique wake word as a trigger type 229, for example, as:

```
{"wake_word":{"alexa":"alexa",
"ok lgi":"lgi_agent",
"ok google":"google_assistant"}}
``` where the wake word "alexa" triggers an Amazon Alexa agent 105, "ok lgi" triggers the LGI agent 105, and "ok google" triggers the Google Assistant agent 105.

At step 808, the audio services agent 105B captures or receives the audio input 108. At step 810, similar to step 710, the audio services agent 105B sends the audio input 108 and/or audio command 245 to the network resource 160, such as to an audio services resource 118 of the network resource 160, for processing. For example, the audio services agent manager 104 can route or send an instruction to the audio services agent 105B that causes the audio services agent 105B to send the audio input 108 and/or the audio command 245 to the network resource 160. At step 812 (similar to or the same as step 712), the audio services agent manager 104 receives a response or agent result from the audio services agent 105B and based on the response or agent result verifies the proper handling of the audio input 108 and/or the audio command 245. For example, the response or agent result can be indicative of a failure of the processing, analysis, or otherwise handling of the audio input 108 by the audio services agent 105B and thus another audio services agent 105 must be selected, the process ends, and/or an error message is provided to the user. At step 814 (similar to or the same as step 714), the audio services agent manager 104 locally performs an audio to text conversion of the audio input 108 to generate an audio command 245. In one or more embodiments, the audio services manager 104 can send the audio input 108 to an ASR agent 105 to implement the conversion of the audio input to an audio command 245.

At step 816 (similar to or the same as step 716), the audio services manager 104 processes, analyzes, or otherwise handles the audio command 245 and/or the audio input 108 based one or more audio service rules 224. As illustrated in FIG. 8, the audio services agent 105A captures, at step 818 (similar to or the same as step 718) the audio input and/or audio command 245 and sends data, at step 820 (similar to or the same as 720), such as the audio input 108 and/or audio command 245, to the network resource 160, for example, the audio services resource 118. For example, the audio services agent manager 104 can route or send an instruction to the audio services agent 105A that causes the audio services agent 105A to send the data to the network resource 160 for processing or otherwise handling of the data. At step 822 (similar to or the same as step 722), the audio services agent manager 104 receives a response or agent result and based on the received response or agent result verifies the proper handling of the audio input 108 and/or audio command 245. For example, the response or agent result can indicate that the audio services agent 105A processed/analyzed, otherwise handled the audio input 108 and/or audio command 245 successfully.

Figure 9:
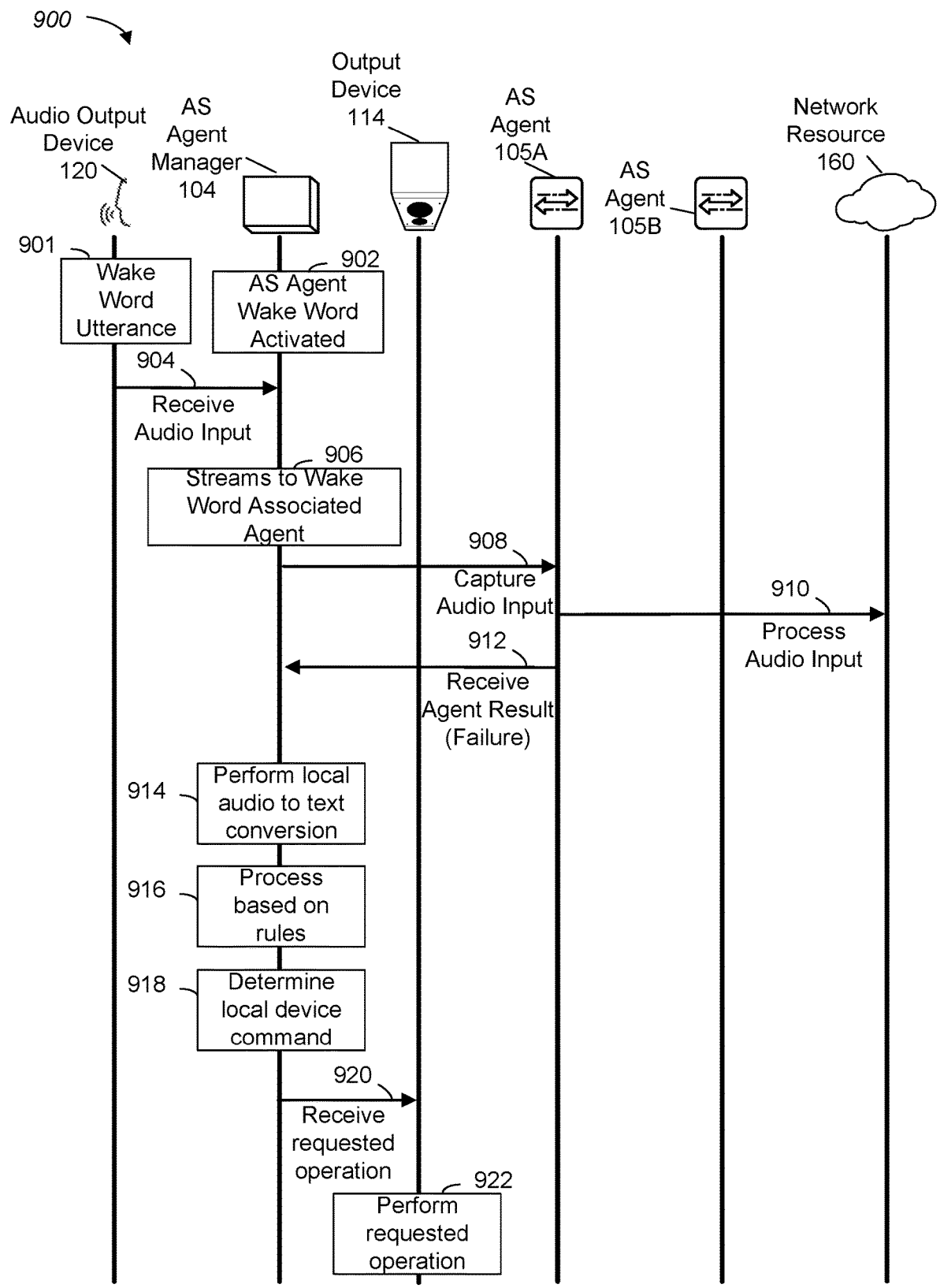
FIG. 9 illustrates a flow diagram of a universal device command received by an audio services agent manager, according to one or more aspects of the present disclosure.

FIG. 9 illustrates a flow diagram 900 of a universal device command received by an audio services agent manager 104, according to one or more aspects of the present disclosure. At step 901 (similar to or the same as step 801), an audio output device 120 outputs a wake word utterance as an audio input 108 and at step 902 (similar to or the same as step 802), this wake word utterance causes an audio services agent wake word to be activated at the audio services agent manager 104. At step 904 (similar to or the same as step 804), the audio services agent manager 104 receives the audio input 108 from an audio input receiver 110 associated with the audio output device 120.

At step 906 (similar to or the same as step 806), the audio services agent manager 104 streams the audio input 108 received at step 904 to a wake word associated audio services agent 105, for example, audio services agent 105A. At step 908, the audio services agent 105A receives and/or captures the audio input 108. At step 910 (similar to or the same as step 810), the audio services agent 105A routes or sends data, for example, the audio input 108 and/or telemetry data 222 associated with the audio input 108, to a network resource 160, such as an audio services controller 116 and the audio services controller 116 processes the received data. For example, the audio services agent manager 104 can route or send an instruction to the audio services agent 105A that causes the audio services agent 105A to send the data to the network resource 160. At step 912 (similar to or the same as step 812), the audio services agent manager 104 receives a response or agent result from the audio services agent 105A. The audio services agent manager 104 verifies that the audio input 108 was handled properly based on the response or agent result. For example, the response or agent result can indicate a failure of the processing, analysis, or otherwise handling of the audio input 108 by the audio services agent 105A such that the verification fails. At step 914 (similar to or the same as step 814), failure of the verification can trigger the audio services agent manager 104 locally performs an audio to text conversion of the audio input 108 to generate an audio command 245. In one or more embodiments, the audio services manager 104 can send the audio input 108 to an ASR agent 105 to implement the conversion to an audio command 245.

At step 916 (similar to or the same as step 816), the audio services agent manager 104 processes, analyzes, or otherwise handles the audio command 245 and/or the audio input 108 based one or more audio service rules 224. At step 918, the audio services agent manager 104 determines that the audio command 245 is a universal device command and/or a local device command based on the one or more audio service rules 224. The universal device command and/or local command can be handled locally at the audio agent services manager 104 as illustrated in FIG. 9 or can be sent to a specified audio services agent 105 as indicated by the associated one or more audio service rules 224. At step 920, the audio command 245 is sent from the audio services agent manager 104 to an output device 114, such as a smart speaker, a television, a display device, any other output device that includes audio playback capabilities or any combination thereof. At step 922, the output device 114 performs the audio service or the requested operation associated with the received audio input from step 904.

With respect to FIGS. 7-11, the audio services agent manager 104 can provide the one or more services associated with the audio input 108 and/or the audio command 245 via or by interfacing with an audio services agent 105, a network resource 160 (such as an audio services controller 116 and/or an audio services resource 118), or any combination thereof. The one or more audio services can be provided via an output device 114. While FIGS. 7-11 illustrates certain steps, the present disclosure contemplates that any one or more steps can be omitted or performed in a different order. For example, storing telemetry data 222 can be performed at, before or at any one or more steps.

Figure 10:
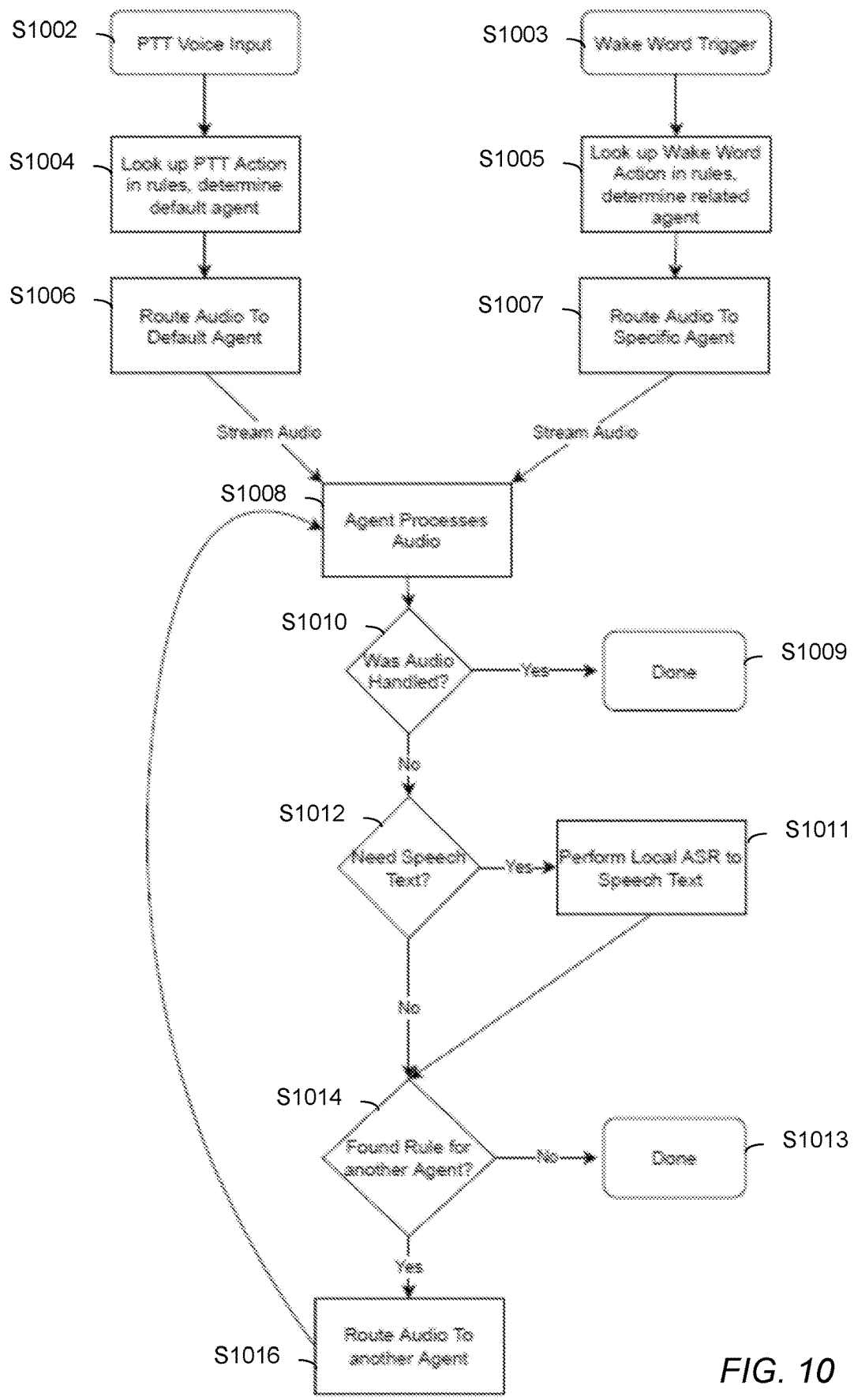
FIG. 10 illustrates a flow diagram of a push-to-talk and/or wake word activation with a default audio services agent, according to one or more aspects of the present disclosure.
Figure 11:
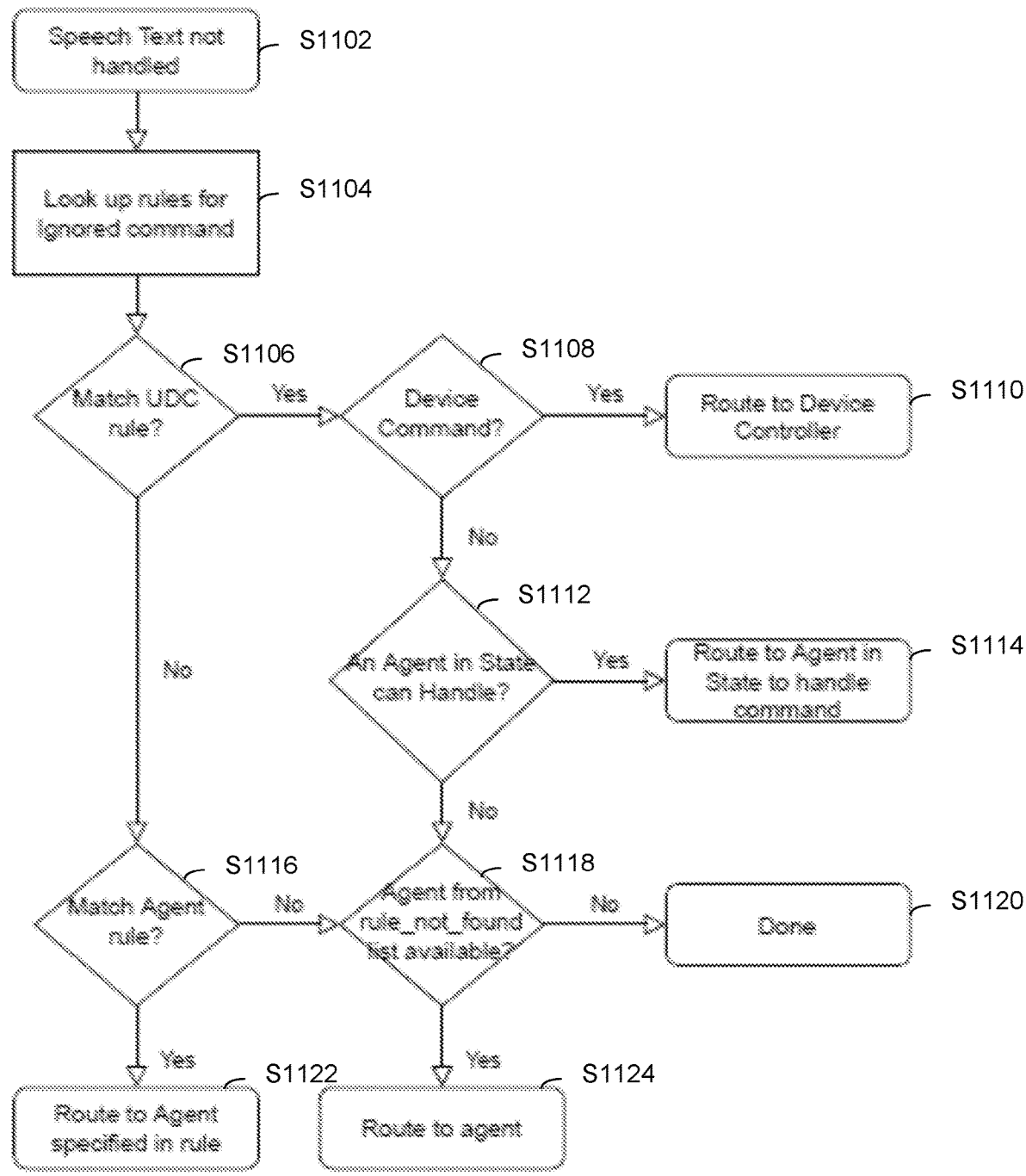
FIG. 11 illustrates a flow diagram for routing an audio input to an audio services agent based on an audio service agent rule, according to one or more aspects of the present disclosure.
Figure 12:
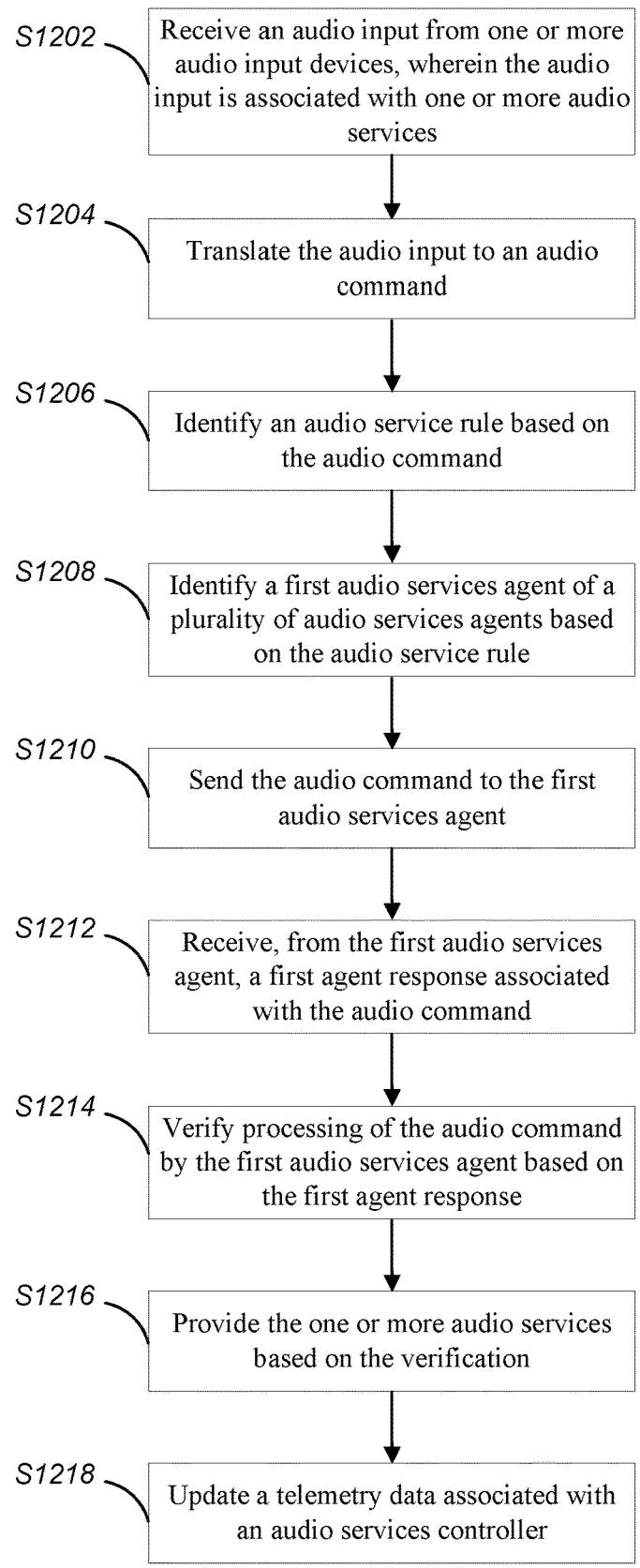
FIG. 12 illustrates a flow chart of for a method of providing an audio service using an audio services agent manager of a control device, according to one or more aspects of the present disclosure.

FIGS. 10-12 illustrate a flow diagram of a method of providing one or more audio services, according to one or more aspects of the present disclosure. In FIGS. 10-12, it is assumed that any one or more of the devices discussed include their respective controllers and their respective software stored in their respective memories, as discussed above in connection with figures of the present disclosure, which when executed by their respective controllers perform the functions and operations in accordance with the example embodiments of the present disclosure (for example, including capturing an audio input and providing an audio service based on the audio input). While the steps of FIGS. 10-12 are presented in a certain order, the present disclosure contemplates that any one or more steps can be performed simultaneously, substantially simultaneously, repeatedly, in any order or not at all (omitted).

FIG. 10 illustrates a flow diagram of a push-to-talk and/or wake word activation with a default audio services agent 105, according to one or more aspects of the present disclosure. As discussed with reference to FIG. 7, a default audio services agent 105 can be identified, for example, by an audio service rule 224 for a trigger type 229 of PTT. At step S1002, a PTT audio input 108 from an audio output device 120 is received by an audio input receiver 110 of the audio services agent manager 104. At step S1004, the audio services agent manager 104, determines a default audio services agent 105 associated with the PTT audio input 108 based on one or more audio service rules 224. For example, the PTT audio input 108 can be associated with a trigger type 229 and/or an audio command type 233 that is associate with an audio services agent ID 225 that indicates the audio services agent 105 to use as the default audio services agent 105. At step S1006, the audio services agent manager 104 routes or sends the audio input 108 to the default audio services agent 105.

As an alternative, at step S1003, the audio input 108 can be received from an audio output device 120 by an audio input receiver 110 of the audio services agent manager 104 as part of a wake word trigger. At step S1005, the audio services agent manager 104 determines an audio services agent 105 associated with the wake word trigger based on one or more audio service rules 224. For example, the trigger type 229 and/or the audio command type 233 can be associated with an audio services agent ID 225 that specifies the audio services agent 105 for handling audio services associated with the wake word trigger. At step S1007, the audio services agent manager 104 routes or sends the audio input 108 to the specified audio services agent 105 based on the one or more corresponding audio service rules 224.

At step S1008, the audio services agent 105, for example, identified or specified in either step S1006 or step S1007, receives a stream of the audio input 108 and/or receives or captures the audio input 108 and processes, analyzes, or otherwise handles the requested audio service indicated by the audio input 108. At step S1010, the audio services agent manager 104 determines whether the audio service associated with the audio input 108 was performed or otherwise handled. For example, the audio services agent manager 104 can receive a response or agent result from the audio services agent 105 that indicates whether the audio service request associated with the audio input 108 was performed or otherwise handled, such as by one or more responses as indicated in Table 2. If the audio services agent manager 104 determines that the audio input 108 was processed and/or otherwise handled based on the response and/or agent result received from the audio services agent 105, the process ends at step S1009.

If the audio services agent manager 104 determines that the requested audio service associated with the audio input 108 was not processed and/or otherwise handled by the audio services agent 105 based on the response and/or agent result from the audio services agent 105, then at step S1012, the audio services agent manager 104 determines whether the audio input 108 should be converted or translated to text via an audio to text converter. If the audio services agent manager 104 determines that the audio input 108 should be converted or translated to text, the audio services agent manager 104 can at step S1011 perform the conversion of the audio input 108 to an audio command 245 locally, such as by a local ASR module of the audio services agent manager 104, or instruct an ASR agent 105C to perform the conversion of the audio input 108 to an audio command 245. After the conversion of the audio input 108 to a text-based audio command 245 or if no conversion is determined to be required such that the audio input 108 is the audio command 245, the process proceeds to step S1014.

At step S1014, the audio services agent manager 104 determines if another audio service rule 224 is associated with the audio command 245. If the audio services agent manager 104 determines that no other audio service rule 224 is applicable or associated with the audio command 245, the process ends at step S1013. If the audio services agent manager 104 determines that another audio service rule 224 is applicable or associated with the audio command 245, then at S1016, the audio services agent manager 104 routes, directs, or sends the audio command 245 to the audio services agent 105 indicated by the another audio service rule 224 and the process continues at step S1008. For example, an initial or first audio service agent 105 is selected and when the initial or first audio service agent 105 fails to handle the audio command 245, a second or another audio service agent 105 is selected based on an audio service rule 224 that indicates the next audio service agent 105 to be tried is the second or another audio service agent 105. The process is repeated until all audio service agents 105 indicated by an associated audio service rule 224 have been tried or all audio service agents 105 indicated by an associated audio service rule 224 have been tried.

FIG. 11 illustrates a flow diagram for routing an audio input 108 to an audio services agent 105 based on an audio service agent rule 224, according to one or more aspects of the present disclosure. At step S1102, the audio services agent manager 104 determines that audio services agent 105 selected did not successfully handle the audio input 108 and/or audio command 245, for example, the selected audio services agent 105 reported to the audio services agent manager 104 in a response or agent result that the audio input 108 and/or the audio command 245 was ignored, failed, was unsuccessful, otherwise not performed, or any combination thereof. At step S1104, the audio services agent manager 104 looks up one or more audio service rules 224 associated with the response and/or the agent result, for example, based on an audio services agent response type 243 of the one or more audio service rules 224.

At step S1106, the audio services agent manager 104 determines if the audio input 108 and/or the audio command 245 matches a universal device command based, for example, an audio command type 233 of the audio service rule 224. If the audio input 108 and/or the audio command 245 matches a universal device command based on an audio command type 233 of the audio service rule 224, the audio services agent manager 104 determines at step S1108 if the matched universal device command is associated with a command for an audio services agent 105, for example, an audio services agent ID 225 is associated with the audio command type 233. If an audio services agent ID 225 is specified at step S1108, then the audio services agent manager 104 routes, directs, or sends the audio input 108 and/or audio command 245 at step S1110 to the identified audio services agent 105, for example, the audio services agent 105 corresponding to the audio services agent ID 225. If an audio services ID 225 is not specified at step S1108, then at step S1112 the audio services agent manager 104 determines if any of the one or more audio services agents 105 have a status or are in a current state to process, analyze, or otherwise handle the audio input 108 and/or the audio command 245. If at step S1112 the audio services agent manager 104 determines and/or identifies that an audio services agent 105 is available to process, analyze, or otherwise handle the audio input 108 and/or the audio command 245, then at step S1114 the audio services agent manager 104 routes, directs, or sends the audio input 108 and/or the audio command 245 to the identified one or more audio services agent 105, for example, based on an audio service agent rule 224. If no audio services agent 105 is identified in step S1112, the process proceeds to step S1118.

If at step S1116, no match is made to a universal device command, the audio services agent 104 determines if the audio input and/or the audio command 245 matches, for example, an audio command type 233 of an audio services agent rule 224. If no match is found at step S1116, the audio services agent manager 104 determines at step S1118 if an audio service rule 224 is associated with a failure to identify an audio services agent 105. If an audio services rule 224 is identified at step S1118, then the audio services agent manager 104 at step S1124 directs, routes, or sends the audio input 108 and/or the audio command 245 to the identified audio services agent from step S1118. In one or more embodiments, a plurality of audio service rules are identified at step S1118 that identify a plurality of audio services agents 105 such that each of the audio services agents 105 are selected based on a priority associated with the audio services agents 105 and the list of audio services agents 105 are traversed based on the priority until a response or an agent result is received indicative of success or the end of the list is reached. If no such audio service rule 224 is determined or identified the process proceeds to step S1120 where the process ends. If at step S1116 a match is determined, the audio services agent manager 104 routes, directs, or sends the audio input 108 and/or the audio command 245 at step S1122 to the audio services agent 105 identified in the matched audio service rule 224 from step S1116.

For example, an audio service rule 224 as discussed with reference to FIG. 11 can be implemented as one or more computer-readable instructions, such as:

FIG. 12 illustrates a flow chart of a method for providing an audio service using an audio services agent manager of a control device, according to one or more aspects of the present disclosure.

In one or more embodiments, a control device 102 may include a controller 208, such as a processor, that may be programmed with or to execute one or more instructions (for example, software or application 212) associated with an audio services agent manager 104 of the control device to perform steps for providing one or more audio services to a user 280, for example, within a network. In FIG. 12, it is assumed that the control device includes its respective controller and software stored in a memory, as discussed above in reference to FIGS. 1-11, which when executed by the controller perform the functions and operations in accordance with the example embodiments of the present disclosure.

The controller 208 executes one or more computer-readable instructions, stored in a memory, for example, a memory 210 of control device 102 that when executed perform one or more of the operations of steps S1202-S1218. In one or more embodiments, the one or more computer-readable instructions may be one or more software applications, for example, a software 212 of a control device 102. While the steps S1202-S1218 are presented in a certain order, the present disclosure contemplates that any one or more steps can be performed simultaneously, substantially simultaneously, repeatedly, in any order or not at all (omitted).

At step S1202, the audio services agent manager 104 receives an audio input 108 from one or more audio input devices 120. The audio input 108 is associated with one or more audio services. The one or more audio services can be associated with an audio services agent 105, an audio services resource 118, or both. For example, an audio services agent 105, an audio services resource 118, or both can provide content to a user 280 via a user interface device 270 and/or an output device 114.

At step S1204, the control device 102 can translate the audio input 108 to an audio command 245. As discussed with reference to FIG. 3, the audio input 108 can be the same as the audio command 245 such that translating the audio input 108 comprises the audio services agent manager 104 processing and/or analyzing the audio input 108 as an audio command 245, routing or sending the audio input 108 to an audio services agent 105, or both. For example, the audio input 108 can be translated or converted to a text-based instruction or any other type of instruction by the audio services agent manager 104 and/or an audio services agent 105, processed so as to be communicable to an audio services agent 105, or both.

```
{"new_audio_input_action":
  [{"ptt":{"default_agent":"lgi_agent"}},
    {"wake_word":{"alexa":"alexa", "ok lgi":"lgi_agent", "ok google":"google_assistant"}},
      {"network_audio_input":{"default_agent":"google_assistant"}}
  ],
"ignored_command_action":
    {"universal_device_commands":{"exact_phrases":["stop", "quit"],
"contains_phrases":["volume"]},
      "agent_phrases":
        {"agent_one": {"contains_phrases":["broadband", "data limit", "channels"]},
          "alexa": {"begins_phrases":["alexa", "who", "what", "where", "why", "when", "play "]}
        }
    },
"rule_not_found_action":{"agent_priority_list":["lgi", "alexa", "google_assistant"]}
}
```

At step 1206, the audio services agent manager 104 identifies an audio services rule 224 based on the audio command 245, for example as discussed with reference to FIG. 5. As an example, the audio command 245 can be associated with an audio command type 233, a trigger type 229, or both. Each audio command type 233 and/or trigger type 229 can be associated with one or more audio service rule IDs 235 that are associated with an action rule 237 for an associated audio services agent ID 225. In this way, the audio services agent manager 104 can loop through all of the audio services agent IDs 225 until the audio command 245 has been processed, analyzed, or otherwise successfully handled or the end of the list of associated audio services agent IDs 225 has been reached. Any one or more of the steps S1202-1218 can be repeated such that a second audio services agent 105 and so on are identified until the end of the list of associated audio services agent IDs 225 is reached or a success response is received.

At step 1208, the audio services agent manager 104 identifies a first audio services agent 105 of a plurality of audio services agents 105 based on the audio service rule 235. For example, each audio services agent 105 can be associated with an audio services agent ID 225 that is associated with the audio service rule 224. Any one or more audio commands 245 can be associated with one or more audio service rule IDs 235 such that one or more associated audio services agent IDs 225 can be associated with an audio service rule 235. In one or more embodiments, the audio services agents IDs 225 are associated with a priority, an order, or a rank such that each audio services agent ID 225 is identified based on the priority, the order or the rank.

At step 1210, the audio services agent manager 104 routes or sends the audio command 245 to the first audio services agent 105 identified at step 1208. The audio command 245 can be sent to the first audio services agent 105 using an API that provides an interface between the audio services agent manager 104 and the audio services agent array 106. At step 1212, the audio services agent manager 104 receives a first audio services agent response associated with the audio command 245 sent to the first audio services agent 105. Similar to step S1208, a second audio services agent response associated with an identified second audio services agent 105 and so on can be received until the audio command 245 has been successfully processed, analyzed, or otherwise handled or until an end of the list of audio services agents 105 associated with the audio service rule 224 has been reached. For example, as discussed with reference to FIG. 3, the audio services agent response received from an identifier audio services agent 105 can be associated with an audio services audio services agent response type 243 of the associated audio service rule 224 and based on the audio services agent response type 243 an associated action rule 237 can be executed.

At step 1214, the audio services agent manager 104 verifies processing of the audio command 245 by the first audio services agent 105 identified at step S1208 (or any other identifier audio services agent 105) based on the audio services agent response received from steps S1212, such as a first audio services agent response, a second audio services agent response, and so on.

At step 1216, the control device 102, the audio services agent manager 104, or both provide the one or more audio services requested or associated with the audio command 245, for example, from a user 280, based on the verification from step S1214 via or by interfacing with the one or more audio services agents 105. Providing the one or more audio services can comprise not directing the audio input 108 and/or the audio command 245 to a different audio services agent 105, ending the processing of the audio input 108 and/or the audio command 245, listening for a request, query, instruction, command, or other information from the audio services agent 105, any other analysis and/or handling of the audio input 108 and/or the audio command 245 and/or the audio services agent 105.

At step 1218, telemetry data 222 associated with an audio services controller 116, for example, as discussed with reference to FIG. 4, is updated based on any of the audio command 245, the identified audio services agent 150 from S1208, an audio services agent response from the identified audio services agent 150, or any combination thereof. The telemetry data 222 can be updated or sent to the audio services controller 116 or any other repository at any step in the process, for example, at any step S1202-S1218.

According to one or more example embodiments of inventive concepts disclosed herein, there are provided novel solutions for providing one or more audio services based on an audio input and one or more associated rules. The control device that includes an audio services agent manager provides a significant improvement over traditional systems as the novel control device not only receives audio input from any one or more sources but also selects an audio services agent based on certain criteria, such as any one or more of the criteria discussed with references to FIGS. 3-6. The user has an improved experience as the audio input is directed to an audio services that is capable of handling the audio input and providing an appropriate response or the user is informed that no audio services agent is available for the requested audio service.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus, or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations, and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A control device, comprising:
a memory storing one or more computer-readable instructions associated with an audio services agent manager; and
a processor configured to execute the one or more computer-readable instructions to perform one or more operations to:
receive an audio input from one or more audio input devices, wherein the audio input is associated with one or more audio services;
translate the audio input to an audio command;
identify an audio service rule based on the audio command;
identify a first audio services agent of a plurality of audio services agents based on the audio service rule;
route the audio command to the first audio services agent;
receive, from the first audio services agent, a first audio services agent response associated with the audio command; and
verify processing of the audio command by the first audio services agent based on the first audio services agent response.

2. The control device of claim 1, wherein the processor is configured to execute the one or more computer-readable instructions to further perform the one or more operations to:
update a telemetry data associated with an audio services controller based on any of the audio command, the first audio services agent, the first audio services agent response, or any combination thereof.

3. The control device of claim 1, wherein translating the audio input comprises:
sending the audio input to an automatic speech recognition agent of the plurality of audio services agents; and
converting, by the automatic speech recognition agent, the audio input to an audio input text string, wherein the audio command is based on the audio input text string.

4. The control device of claim 1, wherein routing the audio command to the first audio services agent comprises sending the audio command via an application programming interface (API) to the first audio services agent, and wherein receiving the first audio services agent response comprises receiving via the API the first audio services agent response from the first audio services agent.

5. The control device of claim 1, wherein verifying processing of the audio command by the first audio services agent comprises determining that the first audio services agent failed to execute the audio command.

6. The control device of claim 5, wherein the processor is configured to execute the one or more computer-readable instructions to further perform the one or more operations to:
identify a second audio services agent of the plurality of audio services agents based on the audio service rule;
route the audio command to the second audio services agent;
receive, from the second audio services agent, a second audio services agent response;
verify processing of the audio command by the second audio services agent based on the second audio services agent response.

7. The control device of claim 1, wherein identifying the first services agent is based on a trigger type associated with the audio input.

8. A method for an audio services agent manager of a control device to route an audio command, the method comprising:
receiving an audio input from one or more audio input devices, wherein the audio input is associated with one or more audio services;
translating the audio input to the audio command;
identifying an audio service rule based on the audio command;
identifying a first audio services agent of a plurality of audio services agents based on the audio service rule;
routing the audio command to the first audio services agent;
receive, from the first audio services agent, a first audio services agent response associated with the audio command; and
verifying processing of the audio command by the first audio services agent based on the first audio services agent response.

9. The method of claim 8, further comprising updating a telemetry data associated with an audio services controller based on any of the audio command, the first audio services agent, the first audio services agent response, or any combination thereof.

10. The method of claim 8, wherein translating the audio input comprises:
sending the audio input to an automatic speech recognition agent of the plurality of audio services agents; and
converting, by the automatic speech recognition agent, the audio input to an audio input text string, wherein the audio command is based on the audio input text string.

11. The method of claim 8, wherein routing the audio command to the first audio services agent comprises sending the audio command via an application programming interface (API) to the first audio services agent, and wherein receiving the first audio services agent response comprises receiving via the API the first audio services agent response from the first audio services agent.

12. The method of claim 8, wherein verifying processing of the audio command by the first audio services agent comprises determining that the first audio services agent failed to execute the audio command.

13. The method of claim 12, further comprising:
identifying a second audio services agent of the plurality of audio services agents based on the audio service rule;
routing the audio command to the second audio services agent;
receiving, from the second audio services agent, a second audio services agent response; and
verifying processing of the audio command by the second audio services agent based on the second audio services agent response.

14. The method of claim 8, wherein identifying the first services agent is based on a trigger type associated with the audio input.

15. A non-transitory computer-readable medium of a control device storing one or more instructions for routing an audio command by an audio services agent manager, which when executed by a processor of the control device, causes the audio services agent manager of the control device to perform one or more operations comprising:
receiving an audio input from one or more audio input devices, wherein the audio input is associated with one or more audio services;
translating the audio input to the audio command;
identifying an audio service rule based on the audio command;
identifying a first audio services agent of a plurality of audio services agents based on the audio service rule;
routing the audio command to the first audio services agent;
receive, from the first audio services agent, a first audio services agent response associated with the audio command;
verifying processing of the audio command by the first audio services agent based on the first audio services agent response.

16. The non-transitory computer-readable medium of claim 15, wherein the one or more instructions when executed by the processor cause the audio services agent manager to perform one or more further operations comprising updating a telemetry data associated with an audio services controller based on any of the audio command, the first audio services agent, the first audio services agent response, or any combination thereof.

17. The non-transitory computer-readable medium of claim 15, wherein translating the audio input comprises:
sending the audio input to an automatic speech recognition agent of the plurality of audio services agents; and
converting, by the automatic speech recognition agent, the audio input to an audio input text string, wherein the audio command is based on the audio input text string.

18. The non-transitory computer-readable medium of claim 15, wherein routing the audio command to the first audio services agent comprises sending the audio command via an application programming interface (API) to the first audio services agent, and wherein receiving the first audio services agent response comprises receiving via the API the first audio services agent response from the first audio services agent.

19. The non-transitory computer-readable medium of claim 15, wherein at least one of:
verifying processing of the audio command by the first audio services agent comprises determining that the first audio services agent failed to execute the audio command; and
identifying the first services agent is based on a trigger type associated with the audio input.

20. The non-transitory computer-readable medium of claim 15, wherein the one or more instructions when executed by the processor cause the audio services agent manager to perform one or more further operations comprising:
identifying a second audio services agent of the plurality of audio services agents based on the audio service rule;
routing the audio command to the second audio services agent;
receiving, from the second audio services agent, a second audio services agent response;
verifying processing of the audio command by the second audio services agent based on the second audio services agent response.

* * * * *